United States Patent [19]

Vos et al.

[11] Patent Number: 5,066,505

[45] Date of Patent: Nov. 19, 1991

[54] COOKING METHOD AND APPARATUS

[75] Inventors: Peter M. Vos; David J. Vos, both of Coolbinia, Australia

[73] Assignee: Vos Fry Systems Australia Ltd., West Perth, Australia

[21] Appl. No.: 283,490

[22] PCT Filed: Apr. 23, 1987

[86] PCT No.: PCT/AU87/00119

§ 371 Date: Oct. 24, 1988

§ 102(e) Date: Oct. 24, 1988

[87] PCT Pub. No.: WO87/06445

PCT Pub. Date: Nov. 5, 1987

[30] Foreign Application Priority Data

Apr. 23, 1987 [AU] Australia .............................. PH5589

[51] Int. Cl.$^5$ .......................... A21B 5/08; A23L 1/01; A47J 27/14; A47J 37/12

[52] U.S. Cl. ........................ 426/438; 99/330; 99/346; 99/404; 99/407; 426/509; 426/523

[58] Field of Search ................................ 99/345–347, 99/352, 355, 360, 361, 403, 404, 405, 406, 407, 409, 443 C, 477, 478, 516, 536, 325, 330, 331, 483; 198/630, 736, 739, 740; 426/511, 438, 523, 439, 509

[56] References Cited

U.S. PATENT DOCUMENTS

| 1,127,634 | 2/1915 | Kerber. | |
| 1,921,231 | 8/1933 | Jourdan | 99/2 |
| 1,927,786 | 10/1933 | Hunter | 53/7 |
| 2,141,362 | 12/1938 | Platt et al. | 198/630 |
| 3,140,776 | 7/1964 | Craver | 198/739 |
| 3,297,125 | 1/1967 | Pool et al. | 198/630 |
| 4,047,476 | 10/1977 | Liebermann | 99/325 |
| 4,134,998 | 1/1979 | Liebermann | 426/438 |
| 4,366,749 | 1/1983 | Caridis et al. | 99/339 |
| 4,383,604 | 5/1983 | Grandemange | 198/775 |
| 4,439,459 | 3/1984 | Swartley | 426/438 |
| 4,581,989 | 4/1986 | Swartley | 99/346 |
| 4,582,047 | 4/1986 | Williams | 99/443 C |
| 4,701,340 | 10/1987 | Bratton et al. | 99/339 |
| 4,745,854 | 5/1988 | Buckley | 99/360 |
| 4,754,700 | 7/1988 | Bichel | 426/511 |
| 4,784,053 | 11/1988 | Barnhart | 99/443 C |
| 4,875,407 | 10/1989 | Inagaki | 99/477 |

FOREIGN PATENT DOCUMENTS

| 2721069 | 12/1977 | Fed. Rep. of Germany. |
| 2425284 | 12/1979 | France. |
| WO83/03043 | 9/1983 | PCT Int'l Appl.. |
| 621821 | 4/1949 | United Kingdom. |

Primary Examiner—Timothy F. Simone
Attorney, Agent, or Firm—John S. Hale

[57] ABSTRACT

Cooking apparatus characterized in that it comprises reservoir means (66) for cooking fluid, cooking fluid spray means (76), means (78, 80, 82) for transferring cooking fluid from said reservoir means (66) to said spray means (76) wherein said spray means (76) is positioned such that food to be cooked is contacted by cooking fluid sprayed from said spray means (76). The food to be cooked may be held on tray means (144), in container means (140) in an annular space (214) defined by concentric wall means (184) or may be fed to the apparatus along conveyor means (14).

22 Claims, 10 Drawing Sheets

COOKING METHOD AND APPARATUS

DESCRIPTION

The present invention relates to cooking apparatus, and in particular to spray cooking apparatus.

FIELD OF THE INVENTION

The apparatus of the present invention provides a significant alternative to conventional cooking apparatus. In particular, the apparatus of the present invention may replace conventional immersion type cooking apparatus in which food items to be cooked are placed in a bath, vat or other container containing cooking fluid. A wide range of foods are cooked in such immersion type cooking apparatus, and the cooking fluids often used are oil or water.

Immersion type cooking apparatus generally uses a large quantity of cooking fluid. This cooking fluid needs to be replaced frequently and often, expensive exhaust systems are also needed.

The cooking apparatus of the present invention is arranged such that it may spray or shower food items to be cooked, with cooking fluid to thereby effect the cooking thereof.

In at least one embodiment of the cooking apparatus of the present invention, a continuous feed and automated system is provided to effect the cooking.

SUMMARY OF THE INVENTION

In accordance with a first aspect of the present invention there is provided cooking apparatus comprising reservoir means for cooking fluid, cooking fluid spray means, means for transferring cooking fluid from said reservoir means to said spray means, conveyor means for conveying food to be cooked from a feed end to a discharge end of said apparatus, wherein said spray means is positioned such that said food to be cooked is contacted by cooking fluid sprayed from said spray means. In accordance with a second aspect of the present invention there is provided a method of cooking comprising storing cooking fluid in reservoir means, transferring said cooking fluid to spray means, conveying food to be cooked from a feed end to a discharge end of said apparatus, and positioning said spray means such that said food to be cooked is contacted by cooking fluid sprayed from said spray means.

In accordance with a third aspect of the present invention there is provided cooking apparatus comprising reservoir means for cooking fluid, cooking fluid spray means, means for transferring cooking fluid from said reservoir means to said spray means, container means rotatably mounted in said apparatus for holding food to be cooked, wherein said spray means is positioned such that said food to be cooked is contacted by cooking fluid sprayed from said spray means.

In accordance with a fourth aspect of the present invention there is provided cooking apparatus comprising reservoir means for cooking fluid, cooking fluid spray means, means for transferring cooking fluid from said reservoir means to said spray means, tray means positioned in said apparatus for holding food to be cooked, wherein said spray means is positioned such that said food to be cooked is contacted by cooking fluid sprayed from said spray means.

In accordance with a fifth aspect of the present invention there is provided cooking apparatus comprising reservoir means for cooking fluid, cooking fluid spray means, means for transferring cooking fluid from said reservoir means to said spray means, concentric wall means defining an annular space for holding food to be cooked, wherein said spray means positioned such that said food to be cooked is contacted by cooking fluid sprayed from said spray means.

In accordance with a preferred aspect of the present invention the conveyor means, container means, tray means or concentric cylinder means, as the case may be, is of a form such that the cooking fluid may be sprayed therethrough.

Preferably, the conveyor means, container means, tray means or concentric cylinder means, as the case may be, is apertured or mesh-like in form.

DESCRIPTION OF THE INVENTION

The following description is given, by way of example only, of embodiments of the cooking apparatus of the present invention.

Figure 1:
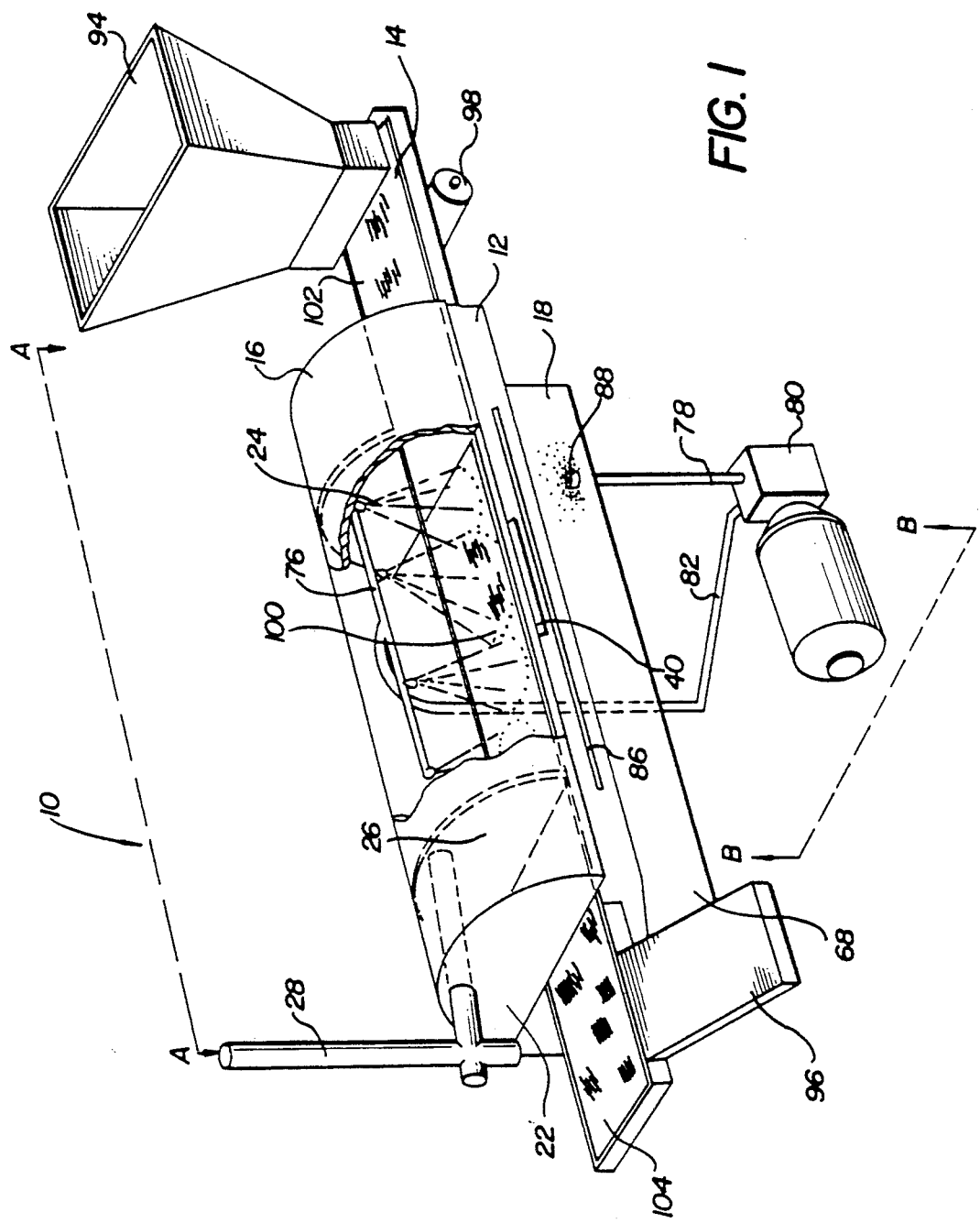
FIG. 1 is an upper perspective view of a first embodiment of the cooking apparatus of the present invention.
Figure 2:
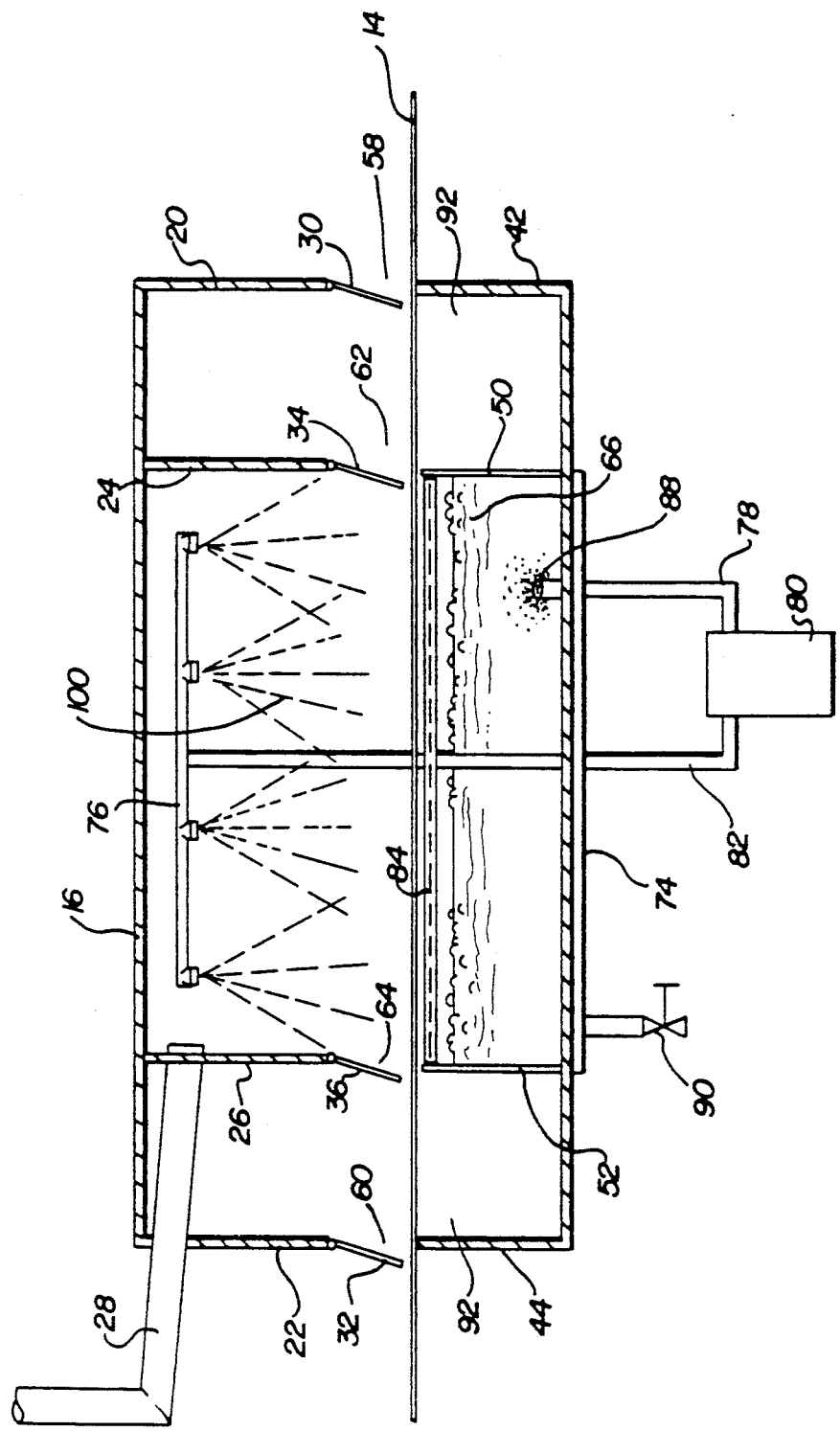
FIG. 2 is a sectional elevation view along the lines A—A of the apparatus shown in FIG. 1.
Figure 3:
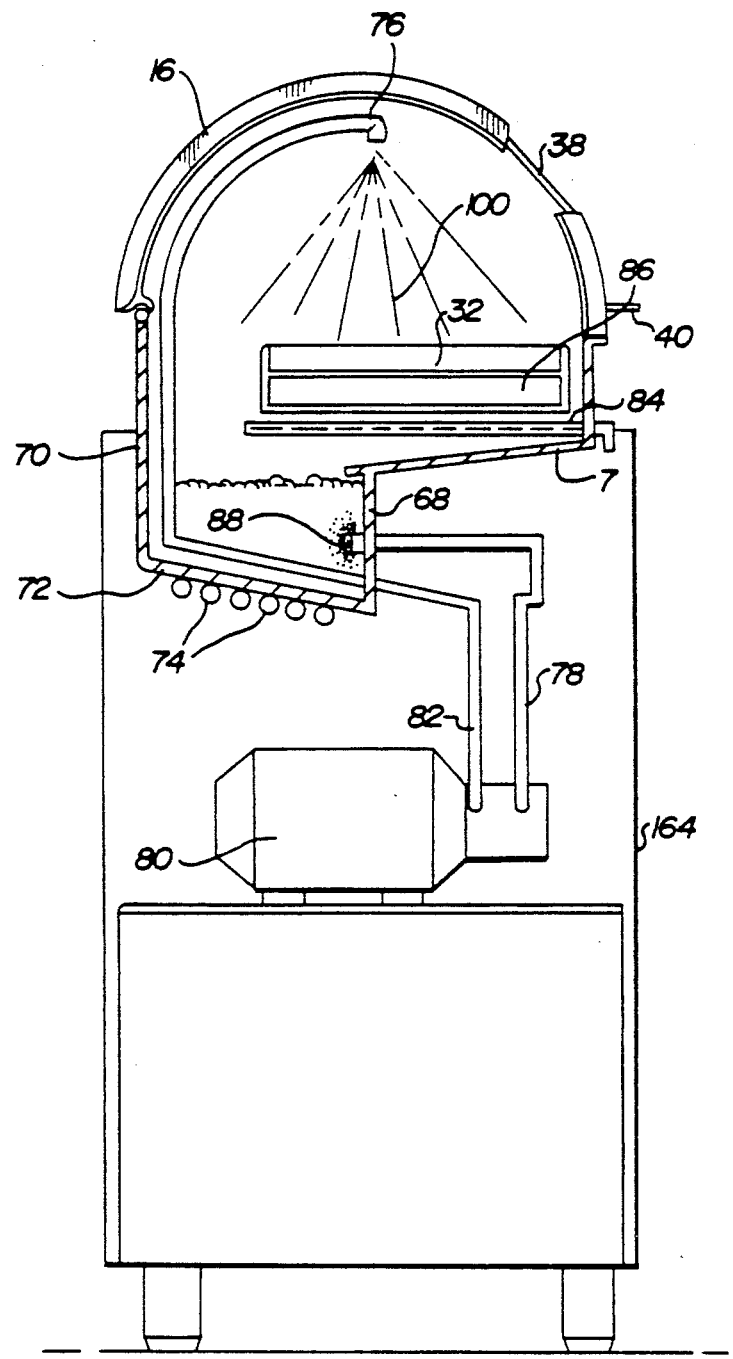
FIG. 3 is a sectional end view along the lines B—B of th apparatus shown in FIG. 1, mounted on a free standing cabinet.
Figure 4:
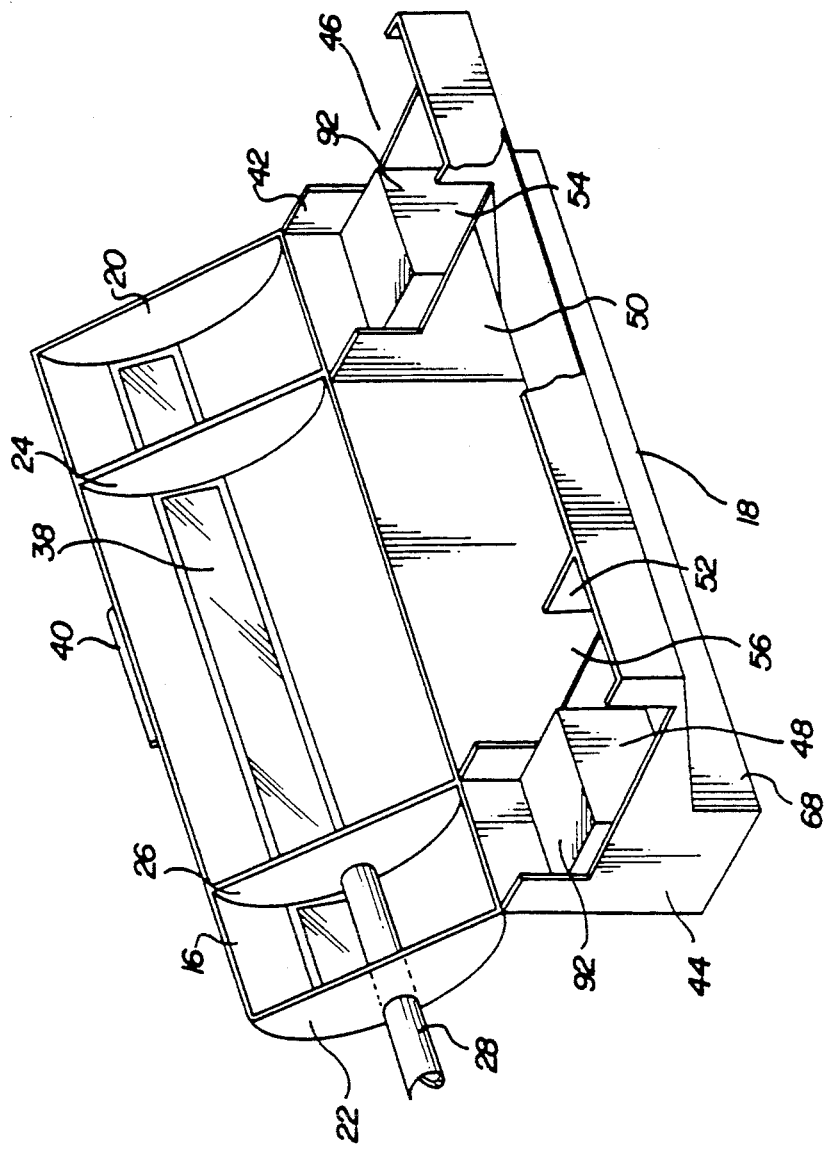
FIG. 4 is an upper perspective view of the housing of the apparatus shown in FIG. 1, with the cover in the open position.
Figure 5:
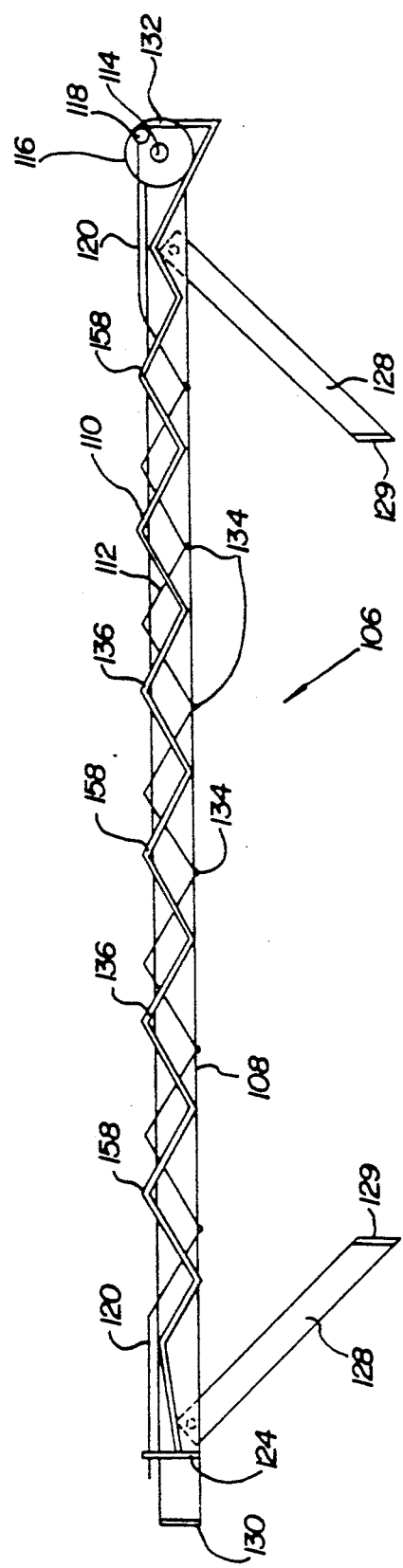
FIG. 5 is a side elevation view of an embodiment of the conveyor shown in FIG. 1, taken along the lines C—C of FIG. 7.
Figure 6A:
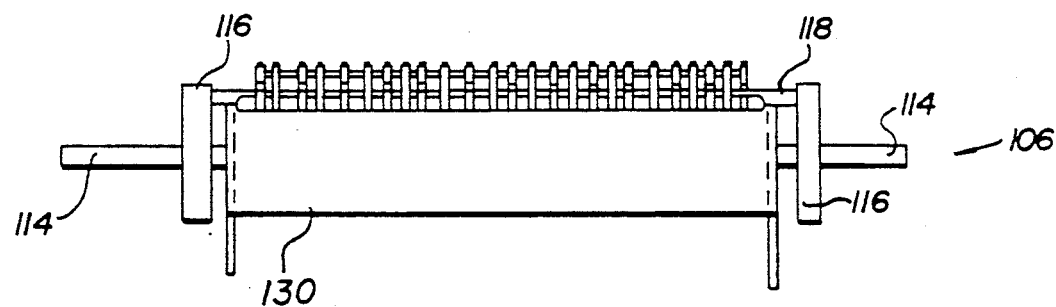
FIG. 6a is an end view of the conveyor along the lines D—D of FIG. 7.
Figure 6B:
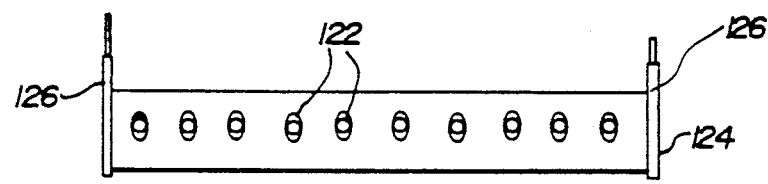
FIG. 6b is an end view of the spreader plate of the conveyor along the lines E—E of FIG. 7.
Figure 7:
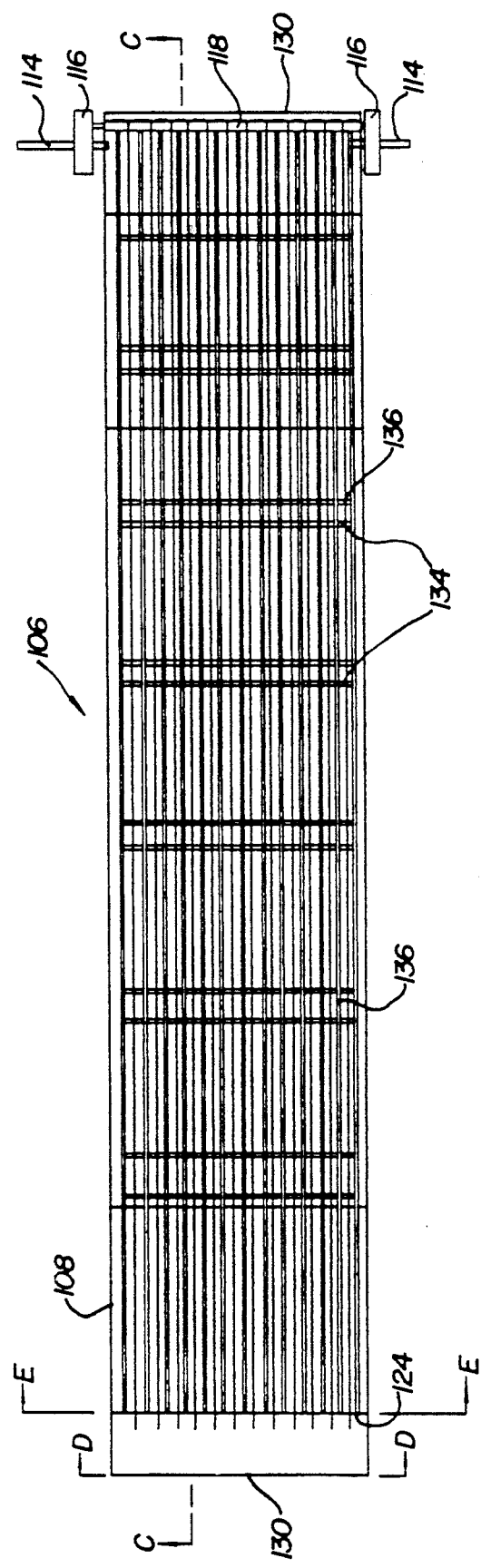
FIG. 7 is a plan view of the conveyor.

In FIGS. 1 to 3, there is shown a first embodiment of a cooking apparatus 10 in accordance with one aspect of the present invention. The apparatus 10 comprises a housing 12, of generally oblong form, and conveyor means 14. The housing 12 comprises a cover 16 pivotally or hingedly connected to a lower portion 18 of the housing 12. The housing 12 is shown separately in FIG. 4, with the cover 16 in its open position, and the conveyor means 14 is shown in FIGS. 5 to 7. The cover 16 is arcuate in cross-section, as best seen in FIG. 3, and is provided with a pair of end plates 20 and 22. The cover 16 is also provided with two internal baffle plates 24 and 26 and an exhaust flue 28 for cooking fumes. The end plates 20 and 22 and the baffle plates 24 and 26 are provided with flaps 30, 32, 34 and 36, respectively, pivotally connected to their respective lower edges.

This is best seen in FIG. 2.

The cover 16 is preferably made from, or incorporates, a thermal insulating material and is provided with an inspection window 38, made from transparent material, at the front thereof. The front of the cover 16 is further provided with a handle 40.

The lower portion 18 of the housing 12 is provided with a pair of end plates 42 and 44. The end plates 42 and 44 have cut-out portions 46 and 48 at their respective upper regions.

The lower portion 18 is further provided with a pair of internal baffle plates 50 and 52. The baffle plates 50 and 52 have cut-out portions 54 and 56 at their respective upper regions.

When the cover 16 is in the closed position, the end plates 20 and 22 are disposed above the end plates 42 and 44, respectively, and the baffle plates 24 and 26 are disposed above the baffle plates 50 and 52, respectively. The cut-out portion 46 then defines a gap 58 between the end plates 20 and 42, and the cut-out portion 48 defines a gap between the end plates 22 and 24. Similarly, the cut-out portion 54 then defines a gap 62 between the baffle plates 24 and 50, and the cut-out portion 26 defines a gap 64 between the baffle plates 26 and 52. The gaps 58, 60 and 62 and 64 are then closed off by the flaps 30, 32, 34 and 36, respectively.

This arrangement is best seen in FIG. 2. The bottom of the lower portion 18 of the housing 12 defines a reservoir trough 66 for cooking fluid. The trough 66 is defined by the front and rear walls 68 and 70 respectively, of the lower portions 18 and the baffle plates 50 and 52. The trough 66 is preferably formed such that its bottom wall 72 slopes downwardly toward the front wall 68, as best seen in FIG. 3. The apparatus 10 also comprises heating means to heat the cooking fluid contained in the trough 66. The heating means is preferably located beneath the bottom wall 72 of the trough 66.

The heating means may be in the form of heating elements 74, of the resistive type. However, any suitable form of heating means may be used, including microwave heating and induction heating to heat the cooking fluid. The apparatus 10 further comprises means to convey the cooking fluid from the trough 66 to a nozzle arrangement 76, comprising a suction line 78 leading from the trough 66 to a pump and motor assembly 80. A discharge line 82 leads from the pump and motor assembly 80 to the nozzle arrangement 76.

When the cover 16 is closed, a cooking zone 100 is defined below the nozzle arrangement 76.

The apparatus 10 may further comprise filter means for filtering the cooking fluid.

Accordingly, a slidable filter tray 84 may be provided to filter cooking fluid after it has been sprayed from the nozzle arrangement 76 and contacts food to be cooked but before it returns to the trough 66. The slidable filter tray 84 is best seen in FIGS. 2 and 3. The slidable filter tray 84 may be slided from the front of the apparatus 10, via the opening 86, best seen in FIG. 1.

The filter means may further comprise another filter 88, located in the trough 66, at the inlet of the suction line 78.

The trough 66 is provided with a drain cock 90 so that the cooking fluid may be periodically drained from the trough 66 and replaced with a fresh supply.

The apparatus 10 may additionally comprise one or more supplementary or reserve tanks 92 for the cooking fluid. The conveyor means 14 rests on the upper edges of the end plates 42 and 44 and the baffle plates 50 and 52. The conveyor means 14 is provided with a feed end 102 and a discharge end 104. A hopper 94 is provided at the feed end 102 and a discharge chute 96 is provided at the discharge end 104. The conveyor means 14 is further provided with a drive motor 98. The hopper 94, discharge chute 96 and drive motor 98 are shown in FIG. 1 and omitted from FIGS. 2 and 3 for clarity. The conveyor means 14 is arranged to carry food to be cooked, from the feed end 102 to the discharge end 104 thereof. The food will pass into the housing 12 and through the cooking zone 100, and will be therein cooked.

Preferably, the conveyor means 14 causes the food to move therealong by a tumbling type motion.

It is preferable that the conveyor means 14 is formed such that cooking fluid may be sprayed therethrough.

This will allow sprayed cooking fluid to return to the trough 66. Thus, the conveyor means 14 may be provided with aperture means.

One embodiment of the conveyor means is shown in FIGS. 5 to 7.

In FIGS. 5 to 7 there is shown a conveyor 106 comprising an outer frame 108 and two sets of longitudinally extending wires 110 and 112. The wires of the set of wires 110 are shown unshaded and the wires of the set of wires 112 are shown shaded, in FIGS. 5 and 7. The wires of the two sets 110 and 112 are of undulating form and are preferably saw tooth shaped, as shown in FIG. 5, or sinusoidal in form.

A stub axle 114 is rotatably mounted on each respective longitudinal section of the frame 108, as best seen in FIG. 7. A drive wheel 116 is fixedly mounted on each of the stub-axles 114. A drive shaft 118 extends between the drive wheels 116. Each end of the drive shaft 118 is eccentrically mounted, with respect to the axes of the stub-axles 114, on a respective drive wheel 116.

Each of the wires of the set of wires 112 has one of its ends connected to the drive shaft 118. This is done in such a manner that the straight end portions 120 of each of the wires of the set of wires 112 is maintained in a substantially parallel disposition to the plane of the conveyor 106. This may be achieved by an appropriate connection means connecting the ends of the wires of the set of wires 112 to the drive shaft 118. The connection means may be in the form of washers (not shown) which are mounted on the drive shaft 118 so as to be rotatable with respect thereto.

The ends of the wires of the set of wires 112 are then fixed to the washers.

Each of the wires of the sets of wires 112 has its other end slidable in respective apertures 122, at the opposed end of the frame 108. These ends of the wires of the set of wires 112 are slidable horizontally with respect to the apertures 122. The apertures 122 are formed in a spreader plate 124 which is connected to a brace 126 at each of its ends. The braces 126 are then connected to the frame 108.

Each of the wires of the set of wires 110 has one of its ends fixedly attached to an end 130 of the frame 108, at 132, as shown in FIG. 5. The other ends of the wires of the set of wires 110 are fixedly attached to the spreader plate 124. This can be best seen in FIGS. 5 and 7.

Cross wires 134 connect the wires of the set of wires 112 and cross wires 136 connect the wires of the set of wires 110 for stability.

The gaps between the wires of the sets of wires 110 and 112 and the cross wires 134 and 136 form the aperture means which allows cooking fluid to pass through the conveyor 106.

The wires of the set of wires 110 are alternately placed with respect to the wires of the set of wires 112, in the frame 108. This is best seen in FIG. 7. When the conveyor 106 is used as the conveyor means 14, in the apparatus 10 shown in FIG. 1, the stub-axles 114 are drivably connected to the motor 98.

Further, when the conveyor 106 is used as the conveyor means 14 when the apparatus 10 is mounted in a free standing cabinet 164, as shown in FIG. 3, a pair of braces 128, connected at each end of the frame 108, support the cabinet. Thus, there are a total of four braces 128 connected to the frame 108. Each of the braces 128 are provided with a face 129 which abuts against the sides of the cabinet 164 to support and stabilize the conveyor 106.

Figure 8:
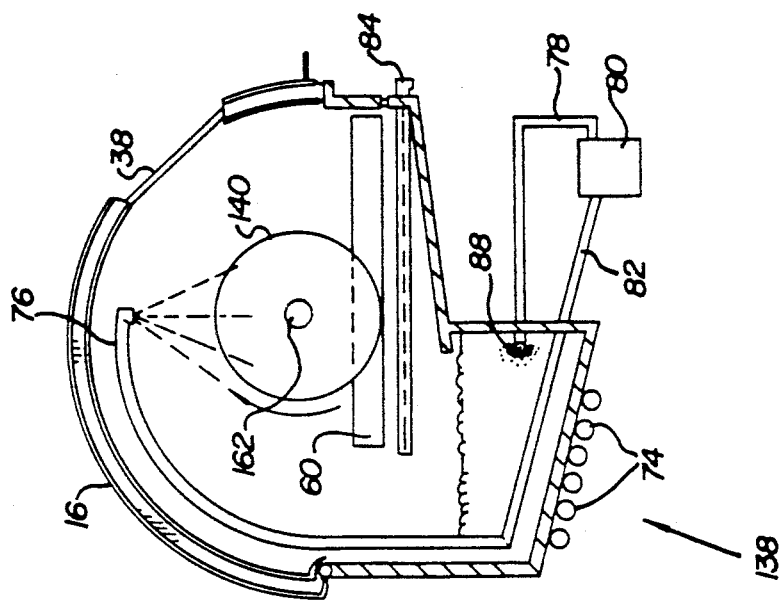
FIG. 8 is a sectional end view of a second embodiment of the apparatus of the present invention incorporating a cylinder for holding food to be cooked.

The embodiment of the apparatus 10 shown in FIGS. 1 to 3 and FIGS. 5 to 7 is arranged for particular use in a continuous feed or automated cooking process. The embodiment of the apparatus 138 shown in FIG. 8 is arranged for use in a batch type cooking process. The apparatus 138 shown in FIG. 8 is similar to the apparatus 10 shown in FIG. 1 except that the conveyor means 14 is replaced by a cylinder 140. The cylinder is rotatably mounted in the housing 12, and is of length to extend substantially the length of the cooking zone 100, between the baffle plates 24 and 26. A suitable motor (not shown) may be provided to rotate the cylinder 140 around its longitudinal axis, as indicated by the arrow in FIG. 8. The cylinder may be rotatable with the shaft 162 which is connected to the aforesaid motor. The shaft 162 may be mounted in the end plates 20 and 22 and baffle plates 24 and 26. The cylinder 140 is preferably of apertured form, e.g. made of a mesh material, and the food items to be cooked are placed therein.

Figure 9:
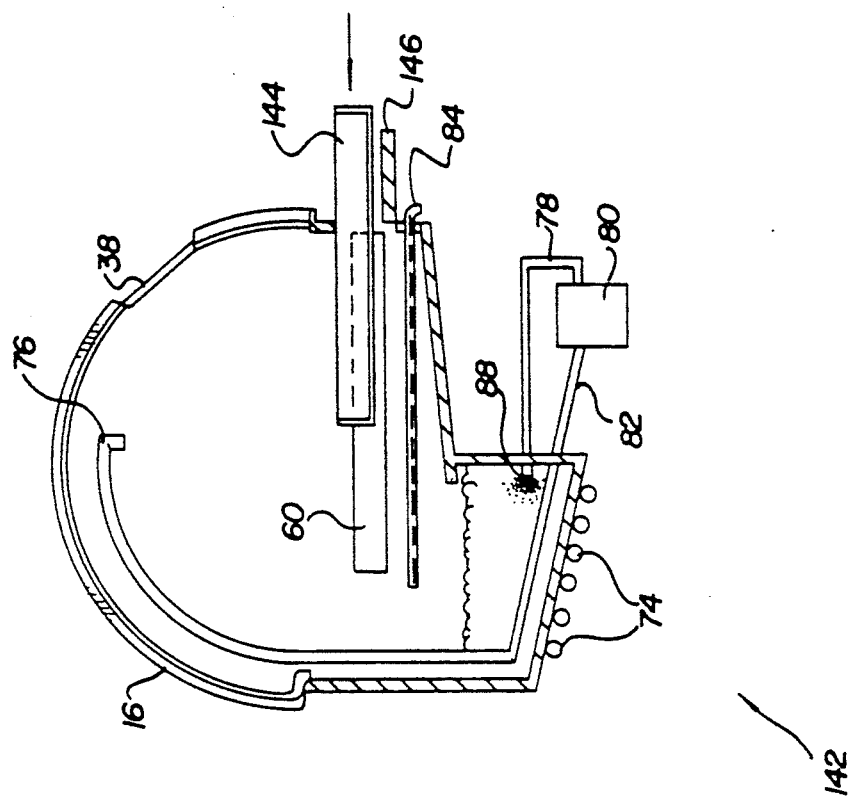
FIG. 9 is a sectional end view of a third embodiment of the apparatus of the present invention incorporating a tray for holding food to be cooked.

The embodiment of the apparatus 142 shown in FIG. 9 is arranged for use in a batch type cooking process, also. The apparatus 142 shown in FIG. 9 is similar to the apparatus 10 shown in FIG. 1, except that the conveyor means 14 is replaced by a tray 144. The tray 144 is stationarily mounted in the housing 12, and is of a length to extend substantially the length of the cooking zone 100, between the baffle plates 24 and 26. The tray 144 may rest on the upper edges of the baffle plates 50 and 52. A door 146 may be provided in the front wall of the lower position 18 for easy insertion and removal of the tray 144 from the interior of the housing 12. The tray 144 is preferably made from a mesh material and the food to be cooked is placed thereon.

The method of operation of the apparatus of the present invention according to the different embodiments will now be described.

With reference to the first embodiment of the apparatus 10 shown in FIG. 1 to 3, and 5 to 7, food items to be cooked are loaded into the hopper 94. The discharge opening of the hopper 94 may be provided with an appropriate metering device (not shown) so that the discharge of food items from the hopper 94 may be controlled. The cooking fluid is then heated by way of the heating elements 74. When the desired operating temperature has been reached, the motor and pump assembly 80 is energized to commence spraying of the cooking fluid from the nozzle arrangement 76. The motor 98 which is connected to one of the stub-axles 114, is then energized. Since the drive wheels 116 are connected by the drive shaft 118, both of the drive wheels 116 are thereby caused to rotate.

The rotation of the drive wheels 116 causes a simultaneous upward-downward and backward-forward movement of the wires of the set of wires 112 with respect to the wires of the set of wires 110. The ends of the wires of the set of wires 112 remote from the drive shaft 118 move in the apertures 122. This movement of the wires of the set of wires 112 causes the food to move along the conveyor 106. The movement of the food along the conveyor 106 occurs because the wires of the set of wires 112 lift and push food items over successive nodes 158 of the wires of the set of wires 110. As the movement of the wires of the set of wires 112 is constrained at the discharge end 104, by the apertures 122, the movement thereof at the discharge end 104 is reduced. This has the effect of reducing the rate of movement of food along the conveyor at the discharge end 104. This is convenient to enable the food to be efficiently transferred to the chute 96. The food moves along the conveyor 106 from the feed end 102 and into the housing 12. The food is conveyed along the conveyor 106 and pushes through the flaps 30 and 34 and into the cooking zone 100. In the cooking zone 100, the food is sprayed or showered with droplets of cooking fluid sprayed from the nozzle arrangement 76. As the food passes through the cooking zone 100, it is cooked.

The extent of cooking may be controlled by the time that it takes for the food to pass through the cooking zone 100. This is controlled by the speed of movement of the wires of the set of wires 112, which is, in turn, controlled by the speed of the motor 98. Thus, the motor 98 is of variable speed.

Further, the extent of cooking may be controlled by the temperature of the cooking fluid. Accordingly, a temperature sensor (not shown) may be provided in the trough 66, to measure the temperature of the cooking fluid therein. Another temperature sensor (not shown) may be provided into the cooking zone 100, to monitor the temperature therein. The apparatus 10 may be provided with control means which adjusts the current flow to the heating elements 74 or alternatively which cycles the heating elements on and off in accordance with preset temperature controls (not shown) and the temperature sensors.

The control means may thus, be connected to the temperature sensors, so that the optimum temperatures of the cooking fluid in the trough 66 and the temperature in the cooking zone 100 may be maintained. The cooked food exits the housing 12 by pushing through the flaps 64 and 60 to arrive at the discharge end 104. The food is then transferred to the discharge chute 96. This may be done by having a deflector plate (not shown) at the discharge end 104 of the conveyor 106 to guide the food into the chute 96. Alternatively, the chute may be provided at the longitudinal end of the conveyor 106, rather than at the side as shown in FIG. 1. The cooked food is then ready for packaging, etc.

The method of operation of the embodiment of the apparatus 138 shown in FIG. 8 will now be described. The cylinder 140 is first loaded with food to be cooked, by opening the cover 16. When the cylinder 140 is loaded, the cover 16 is again closed.

The cooking fluid is once again heated and when the operating temperature has been reached, the motor and pump assembly 80 is energized to spray cooking fluid from the nozzle arrangement 76.

Another motor (not shown) is energized to rotate the shaft 162. This causes the cylinder 140 to rotate. The cylinder 140 being made from an apertured or mesh material, allows the sprayed or showered cooking fluid to contact and thereby cook the food in the cylinder 140. A timer (not shown) may be provided to control the cooking time. The timer may be connected to the motor rotating the shaft 162 and the motor and pump assembly 80. The temperature sensors described in relation to the embodiment of FIGS. 1 to 3 and FIGS. 5 to 7, may be employed in the apparatus 138 also.

When the food items have been cooked for the desired time, the motors stop and the cooked food may be removed from the cylinder 140.

The method of operation of the embodiment of the apparatus 142, shown in FIG. 9 will now be described. The door 146 is opened and the tray 144 removed and loaded with food to be cooked. The tray is reinserted into the housing 12. The cooking fluid is heated and when operating temperature has been reached, the motor and pump assembly 80 is energized. The food is then sprayed or showered with cooking fluid from the nozzle arrangement 76 to cook the food. The tray 144 is made from an apertured or mesh material, such that the cooking fluid may be sprayed therethrough, as described in relation to the previous embodiments.

The apparatus 142 may be controlled by a timer (not shown) as previously described in relation to the apparatus 138 of the embodiment of FIG. 8. Once the food is cooked, the tray 144 may be removed from the housing 12.

Each of the embodiments of the present invention shown in FIGS. 1 to 9, may incorporate an additional filter means for the cooking fluid.

Figure 10:
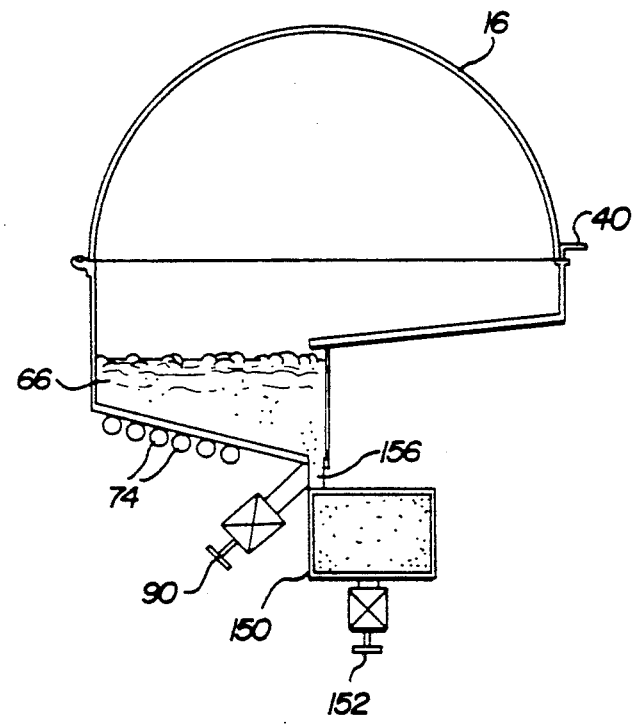
FIG. 10 is an end view showing the incorporation of an additional filter means in the form of a fluid tank in the cooking apparatus of the present invention.
Figure 11:
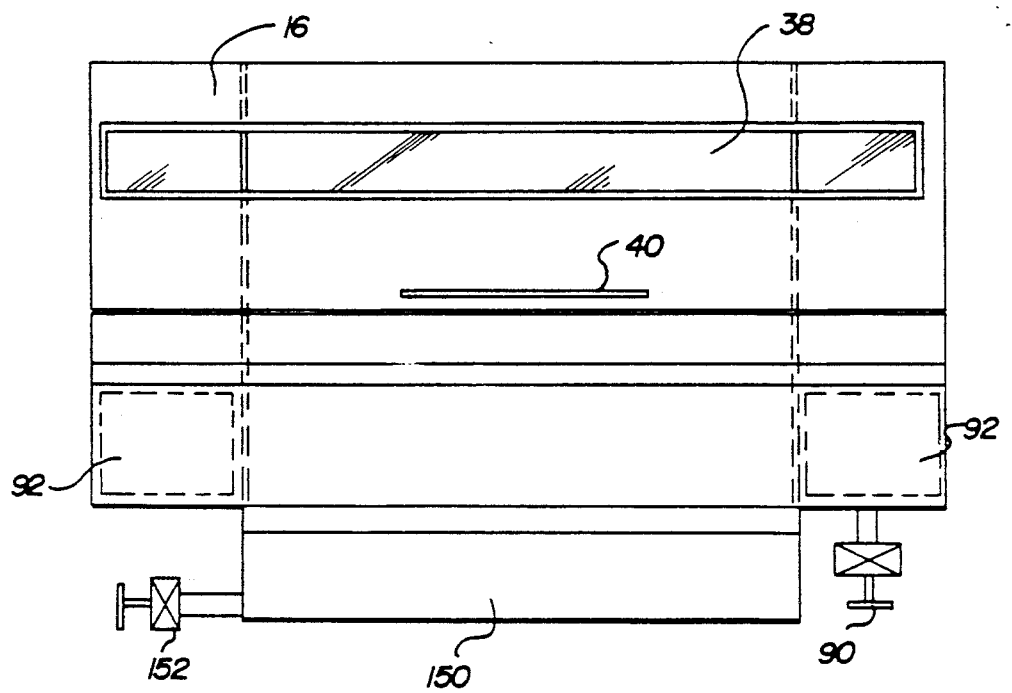
FIG. 11 is a front elevational view showing the incorporation of the additional filter means in the form of a fluid tank in the cooking apparatus of the present invention; and, FIG. 12 is an upper perspective view of a fourth embodiment of the present invention, with particular application to a domestic situation.

An embodiment of the additional filter means is shown incorporated into the apparatus of the present invention in FIGS. 10 and 11.

The additional filter means may be in the form of a tank 150 containing a fluid. The tank 150 is connected to the trough 66 by a narrow slot or neck 156. The fluid contained in the tank 150 has a density greater than the density of the cooking fluid in the trough 66. In this way, the cooking fluid in the trough 66 floats on the fluid in the tank 150. Sufficient fluid is poured into the tank 150 to fill the slot or neck 156 up to the level of the drain cock 90. A drain cock 152 is provided to drain fluid from the tank 150.

In use, the tank 150 is filled (with the trough 66 empty of cooking fluid). The cooking fluid is then slowly poured into the trough 66 so as not to cause significant suspension or emulsion of the two fluids. However, any emulsion or suspension that does occur will be separated due to the different densities of the two fluids. When it is necessary to drain the trough 66 and tank 150, the trough 66 is drained first via the drain cock 90 followed by the tank 150 via the drain cock 152. During the cooking process, and particularly when the cooking fluid used is oil, contamination of the cooking fluid may occur.

When cooking with oil, over heating of the oil may cause it to "burn" transferring a taste and odour to the food being cooked. Further, the presence of small, loose food particles and other debris may become held in suspension or entrained in the oil, with the result that they become "over cooked" and thus causing carbon to be present in the cooking oil. Alternatively, they may lodge on the heating elements 74 and become "baked on".

In the present invention, when the heating elements are positioned outside the trough 66, carbonised food particles and other debris cannot come into contact with the heating elements 74.

When the tank 150 is employed, any loose or small particles of food and other debris which may be picked up by the oil, will gravitate down to the bottom of the trough 66 and into the tank 150, via the slot or neck 156 to the tank 150. In this way, such food particles and other debris are separated from the cooking oil and are not able to re-enter or remain in suspension or entrained in the cooking oil.

The drain cock 90 allows the trough 66 to be drained on a daily basis whilst the tank 150 may require draining only once a week, the fluid therein being cast off. When oil is used as the cooking fluid, the fluid used in the tank 150 may conveniently be water. The cooking TM fluid used in the present invention may be any appropriate type. The cooking fluid may, for example be oil, water, etc. Use of oil would result in the food items being "spray-fried" whilst use of water would result in the food items being "spray-steamed". The reserve tank 92 may be in fluid communication with the trough 66. In this way, cooking fluid may be added to the reserve tanks 92 rather than to the trough 66, when required.

The apparatus of the present invention, shown in FIGS. 1 to 11, may be mounted in a free standing cabinet 164, as shown in FIG. 3.

The embodiments of the cooking apparatus of the present invention shown in FIGS. 1 to 11 are primarily intended for commercial use.

Figure 12:
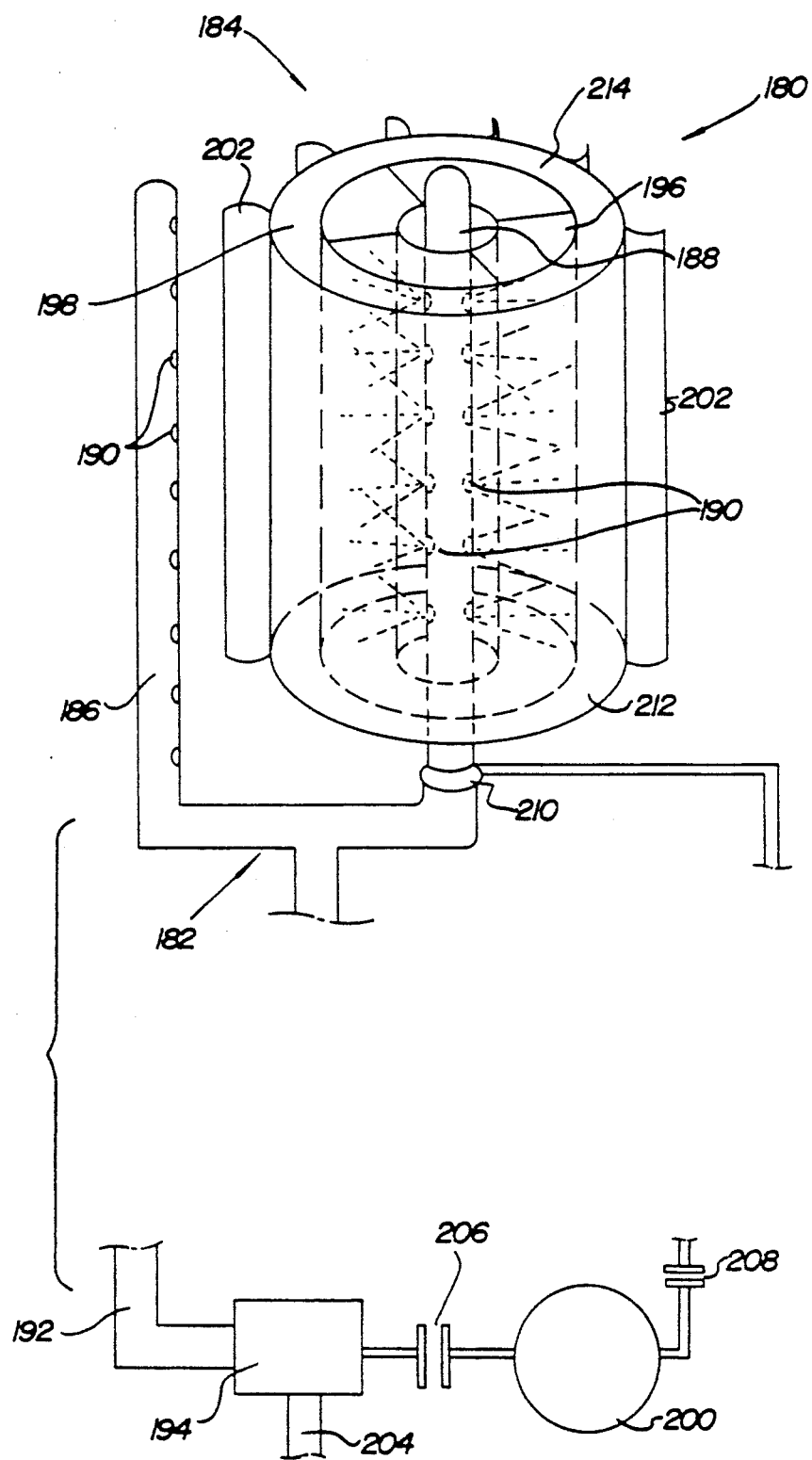

FIG. 12 shows an embodiment that is intended for domestic use.

In FIG. 12 there is shown a cooking apparatus 180 comprising spray means 182 and concentric cylinder means 184.

The concentric cylinder means 184 comprises an inner cylinder 196 and an outer cylinder 198 concentrically mounted on a discharge pipe 188, and defining an annular space 214 therebetween. The outer cylinder 198 is mounted on the pipe 188 so as to be freely rotatable with respect thereto. The inner cylinder 196 is mounted on the pipe 188 so as to be rotatable under power from a motor 200.

Preferably, the outer cylinder is provided with substantially upright curved blades or vanes 202 positioned around its outer surface. Further, the outer cylinder 198 may be provided with an annular plate 212 at its base, such that food placed in the annular space 214 between the inner cylinder 196 and the outer cylinder 198 is retained thereon.

Preferably, the inner cylinder 196 and the outer cylinder 198 are of a form such that cooking fluid may be sprayed through them, e.g. they may be of apertured or mesh-like material.

The spray means 182 comprises two substantially upright discharge pipes 186 and 188. The discharge pipes 186 and 188 are provided with a plurality of apertures 190 from which cooking fluid may be sprayed. Whilst it is preferred that the spray means 182 comprises two discharge pipes 186 and 188 the spray means 182 may comprise only one of these pipes. However, the discharge pipe, or similar, would always need to be employed since the inner cylinder 196 and the outer cylinder 198 are mounted thereon.

The discharge pipes 186 and 188 are connected to a common line 192 leading from a pump 194. The pump 194 has a suction line 204 leading thereto. The suction line 204 leads from a reservoir (not shown) for cooking fluid.

Heating means (not shown) is also provided, to heat the cooking fluid in the cooking fluid reservoir. This heating means may be similar forms to those described in relation to the embodiments of FIGS. 1 to 11. The pump 194 is connectable to the motor 200 by way of a clutch 206.

The motor 200 may be connected, by way of a clutch 208, to a gear 210 to cause one or both of the inner cylinders 196 and outer cylinders 198 to rotate. The entire apparatus shown in FIG. 12 is enclosed in a housing (not shown) provided with a lid (also not shown). The housing is preferably made of or incorporates, thermal insulating material This housing is preferably of cylindrical form and its dimensions approximately 30 cm high × 30 cm in diameter. Further, it is preferable that the cooking fluid reservoir is positioned below the concentric cylinder means 184 such that any cooking fluid sprayed from the spray means 182 that is not consumed, returns to the cooking fluid reservoir for re-heating and re-use. The operation of the embodiment of the cooking apparatus shown in FIG. 12 will now be described. Food to be cooked is placed in the annular space 214 between the inner cylinder 196 and the outer cylinder 198.

The cooking fluid is then heated by way of the heating means. When the desired operating temperature has been reached, the clutch 206 is engaged such that the motor 200 causes the pump 194 to operate. The pump 194 then commences to spray cooking fluid from the apertures 190 of the discharge pipes 186 and 188.

Some of the cooking fluid sprayed from the apertures 190 of the discharge pipe 186 hits the vanes 202, causing the outer cylinder 198 to rotate. This rotation of the outer cylinder 198 provides for efficient cooking of the food contained in the annular space 214.

When the cooking of the food is completed, the clutch 206 is disengaged resulting in the pump 194 stopping to pump cooking fluid to the spray means 182. The clutch 208 may then be engaged such that the motor 200 causes one or both of the inner cylinder 196 and outer cylinder 198 to rotate. This action is a drying step and removes excess cooking fluid, if present, from the cooked food.

However, as the apparatus 184 achieves very acceptable results without the inclusion of a drying step, the clutch 208 and gear 210 may be omitted from the apparatus 184 and are to be considered as optimal only. The apparatus 184 may incorporate temperature sensor means in a manner analogous to that described in connection with the embodiments shown in FIGS. 1 to 11. The apparatus of the embodiments of the present invention significantly reduces the cooking time compared with immersion type cooking apparatus in which food to be cooked is immersed into a heated bath, vat or other container of cooking fluid. In particular, when the apparatus of the present invention is used with oil as the cooking fluid, food is cooked more satisfactorily than in immersion apparatus.

It would appear that the present apparatus enables the food to be seared at its surface before its moisture content escapes. This appears to enable the cooking process to then proceed at a higher temperature as compared with immersion type cooking apparatus. The cooking apparatus of the present invention allows for quicker, more efficient cooking and results in better tasting and less "greasy" cooked food. Further, the amount of cooking fluid that is consumed is greatly reduced and any cooking fluid sprayed onto the food that is not used, may be returned to the cooking fluid reservoir for re-heating and re-use. Further, as regards the cooking apparatus of the present invention intended for commercial use, i.e. the embodiments of the apparatus shown in FIGS. 1 to 11, significantly less fumes are produced thereby than from conventional immersion type cooking apparatus. Accordingly, an expensive exhaust system is not required.

The flue 28 is sufficient to exhaust any cooking fumes from the apparatus. Further, the fumes that are released mostly comprise water vapour, making for a cleaner cooking environment.

Further, as only the flue 28 is required for exhaust, the cooking process is further enhanced. This is because the entire cooking process may be carried out in an enclosed environment.

The heat is retained inside the cooking zone 100 as openings to the cooking zone 100 are closed off by the flaps 30, 32, 34 and 36, and the exiting fumes from the flue 28 prevent entry of outside air to the cooking zone 100. As a result, there is a slight positive pressure in the interior of the housing 12, which further prevents entry of the outside air into the cooking zone 100.

To further retain the heat in the cooking zone 100, all of the walls of the hosuing 12 along with baffle plates 24 and 26 may incorporate appropriate thermal insulating material. The suction and discharge lines 78 and 82 may also be insulated.

The above features may reduce the energy and cooking fluid cunsumption of the apparatus.

The apparatus may be easily cleaned by draining the trough 66 and tank 150 and filling them with a suitable cleaning solution. The pump and motor assembly 80 is then energized to thereby spray the cleaning solution from the nozzle arrangement 76. This cleans the suction and discharge lines 78 and 82 and the interior of the housing 12. The cleaning solution may be drained from the trough 66 and tank 150 when the cleaning operation is completed.

The cooking apparatus of the present invention is intended for domestic use, i.e. the embodiment of the apparatus shown in FIG. 12, produces a minimum of cooking fumes. This is due to the smaller scale of the cooking operation. A vent (not shown in FIG. 12) may be incorporated in the apparatus 184 to exhaust any fumes, that might be produced, from the interior cooking region of the apparatus 184.

The embodiment of the cooking apparatus shown in FIG. 12 may also incorporate thermal insulating materials to reduce heat loss. The housing and lid of the apparatus 184 may be made of, or incorporate, insulating material.

The apparatus 184 may be cleaned, using a cleaning solution, in an analogous manner to that hereinbefore described in connection with the embodiments shown in FIGS. 1 to 11.

The cooking apparatus of the present invention may be used to cook a wide variety of foods, including chicken pieces and other meat pieces, fish, Chinese foods, pastas, vegetables and beef.

Modifications and variations such as would be apparent to a skilled addressee are deemed within the scope of the present invention.

We claim:

1. Cooking apparatus comprising a housing, reservoir means for cooking fluid, spray means positioned in said housing, means for transferring cooking fluid from said reservoir means to said spray means, conveyor means for conveying food through said housing in a direction of passage from a feed end to a discharge end, said conveyor means being provided with aperture means, said spray means positioned such that, when said cooking apparatus is in operation, cooking fluid sprayed therefrom contacts and cooks food being conveyed by said conveyor means and said cooking fluid is able to pass through said aperture means of said conveyor means, said conveyor means comprising at least a first and a second set of elongate members extending longitudinally in the direction of passage of said food through said housing with at least one of the elongate members of said first set of elongate members being undulating and movable, in operation, to advancingly convey food placed on said conveyor means in a tumbling manner.

2. Cooking apparatus according claim 1, wherein elongate members of said first set of elongate members are connected by at least a first set of interconnecting members and elongate members of said second set of interconnecting members form gaps between said first and second sets of elongate members and said first and second sets of interconnecting members through which said cooking fluid is able to pass.

3. Cooking apparatus according to claim 1, wherein at least one of said elongate members of said second set of elongate members is undulating.

4. Cooking apparatus according to claim 1, wherein all of said elongate members of said first set of elongate members are undulating.

5. Cooking apparatus according to claim 1, wherein all of said elongate members of said second set of elongate members are undulating.

6. Cooking apparatus accordingly to claim 1, wherein said undulating elongate members are of a substantially saw tooth form.

7. Cooking apparatus accordingly to claim 1, wherein said undulating elongate members are of a substantially sinusoidal form.

8. Cooking apparatus according to claim 3, wherein said undulating elongate members are of a substantially saw tooth form.

9. Cooking apparatus according to claim 3, wherein said undulating elongate members are of a substantially sinusoidal form.

10. Cooking apparatus according to claim 1, wherein said elongate members of said first and second sets of elongate members are disposed alternately relative to the transverse direction of said conveyor means.

11. Cooking apparatus according to claim 1, wherein said elongate members of said first set of elongate members are connected to shaft means at one of their respective ends with the other ends being free to move, said shaft means connected to drive wheel means, such that upon rotation of said drive wheel means said elongate members of said first set of elongate members are caused to move in a backward-forward, upward-downward cyclical motion to convey food along said conveyor means.

12. Cooking apparatus according to claim 11, wherein said conveyor means further comprises frame means to support said first and second sets of elongate members and said drive wheel means wherein the free ends of said elongate members of said first set of elongate members are receivable in apertures of a portion of said frame means, said drive wheel means being mounted near a first end of said frame means and the ends of said elongate members of said second set of elongate members being connected to said frame means portion and said first end, respectively.

13. Cooking apparatus according to claim 11, wherein said conveyor means further comprises frame means to support said first and second sets of elongate members and said drive wheel means wherein the free ends of said first set of elongate members are receivable in apertures of a portion of said frame means, said drive wheel means being mounted near a first end of said frame means and the ends of said elongate members of said second set of elongate members being connected to said portion and said first end of said frame means, a portion of said frame means comprising a spreader plate extending between respective longitudinal sides of said frame means and positioned closer to a second end of said frame means.

14. Cooking apparatus according to claim 11, wherein said elongate members of said first set of elongate members are connected to said shaft means by respective washer means which are rotatably mounted on said shaft means.

15. Cooking apparatus according to claim 11, wherein said drive wheel means comprises a pair of drive wheels and said shaft means extending between said drive wheels such that it is eccentric relative to the respective axes of said drive wheels.

16. Cooking apparatus according to claim 1, wherein said housing comprises first, second and third chambers arranged sequentially, said spray means being positioned in said second chamber such that, when said cooking apparatus is in operation, food conveyed along said conveyor means enters said housing at said feed end and passes through said housing from said first chamber to said second chamber to said third chamber and leaves said housing at said discharge end.

17. Cooking apparatus according to claim 16, wherein said first and second chambers and said second and third chambers are, respectively, separated by wall means provided with pivotable flap means and pivotable flap means are provided at said feed and discharge ends of said cooking apparatus such that, when said cooking apparatus is in operation, food may pass along said conveyor means from said feed end to said discharge end through said housing.

18. Cooking apparatus according to claim 1, wherein inlet hopper means is provided at said feed end and discharge chute means is provided at said discharge end.

19. Cooking apparatus according to claim 1, wherein when said cooking apparatus is in operation, excess cooking fluid sprayed from said spray means is returned to said reservoir means and passes through filter means prior to being resprayed through said spray means.

20. Cooking apparatus according to claim 1, further comprising supplementary reservoir means for cooking fluid wherein said supplementary reservoir means is in fluid communication with said reservoir means such that the amount of cooking fluid in said reservoir means is replenishable from said supplementary reservoir means.

21. Cooking apparatus according to claim 1, further comprising heating means for heating said cooking fluid and motor and pump assembly means for transferring cooking fluid to said spray means via pipe means.

22. A method of cooking food comprising:
providing a cooking apparatus comprising a housing;
storing cooking fluid in reservoir means;
positioning spray means in said housing for spraying said cooking fluid therefrom;
transferring said cooking fluid from said reservoir means to said spray means via cooking fluid transfer means;
conveying food in a direction of passage from a feed end to a discharge end of said cooking apparatus along conveyor means which comprises at least a first and second set of elongate members extending longitudinally in the direction of passage of said food through said housing with at least one of the elongate members of said first set of elongate members being of undulating form and movable; and
spraying cooking fluid from said spray means onto said food to cook said food as it is conveyed from said feed end to said discharge end while advancingly conveying said food from said feed end to said discharge end in a tumbling manner by said conveyor means.

* * * * *